(12) United States Patent
Forster et al.

(10) Patent No.: US 7,432,869 B2
(45) Date of Patent: Oct. 7, 2008

(54) MULTIPLE FEED POINT SLOT ANTENNA

(75) Inventors: Ian J. Forster, Chelmsford (GB); Peter Robert George Horrell, Chelmsford (GB)

(73) Assignee: Mineral Lassen LLC, Las Vegas, NV (US)

( * ) Notice: Subject to any disclaimer, the term of this patent is extended or adjusted under 35 U.S.C. 154(b) by 0 days.

(21) Appl. No.: 11/469,360

(22) Filed: Aug. 31, 2006

(65) Prior Publication Data

US 2007/0075906 A1 Apr. 5, 2007

Related U.S. Application Data

(63) Continuation of application No. 11/318,339, filed on Dec. 23, 2005, which is a continuation of application No. 10/125,783, filed on Apr. 18, 2002, now Pat. No. 6,985,119, which is a continuation-in-part of application No. 09/536,334, filed on Mar. 25, 2000, now Pat. No. 6,628,237.

(51) Int. Cl.
*H01Q 13/10* (2006.01)

(52) U.S. Cl. .................... 343/767; 343/746; 340/572.7

(58) Field of Classification Search ............... 343/746, 343/767, 768; 340/572.1, 572.4, 572.7, 572.8; 455/41.1, 25, 523, 63.4
See application file for complete search history.

(56) References Cited

U.S. PATENT DOCUMENTS

| | | | |
|---|---|---|---|
| 3,961,323 A | 6/1976 | Hartkorn | |
| 4,051,480 A | 9/1977 | Reggia | |
| 4,086,598 A | 4/1978 | Bogner | |
| 4,782,345 A | 11/1988 | Landt | |
| 4,975,711 A | 12/1990 | Lee | |
| 5,255,819 A | 10/1993 | Peckels | |
| 5,339,074 A | 8/1994 | Shindley | |
| 5,448,220 A | 9/1995 | Levy | |
| 5,461,393 A | 10/1995 | Gordon | |
| 5,495,218 A | 2/1996 | Erb et al. | |
| 5,507,411 A | 4/1996 | Peckels | |

(Continued)

FOREIGN PATENT DOCUMENTS

DE 44 46 203 A1 6/1996

(Continued)

*Primary Examiner*—Thuy Vinh Tran
(74) *Attorney, Agent, or Firm*—Christensen O'Connor Johnson Kindness PLLC

(57) ABSTRACT

A wireless communication device and method for identifying a container, or communication information about a container using a slot in the container as an antenna. The device includes a wireless communication device for transmitting information regarding the container. The container includes an outer wall forming rim and a slot between the rim edge and the outer wall that is circular and continues without boundaries. The wireless communication device is coupled to the slot to provide the slot antenna for communications. An impedance matching network is additionally provided to make the operating frequency of the slot substantially the same as the operating frequency of the wireless communication device. Alternatively, shorting posts may be placed in the slot to define boundaries of the slot to match the operating frequency of the slot to the operating frequency of the antenna. Multiple feed points may be provided between the wireless communication device and the slot.

22 Claims, 19 Drawing Sheets

U.S. PATENT DOCUMENTS

| | | |
|---|---|---|
| 5,621,419 A | 4/1997 | Meek et al. |
| 5,682,143 A * | 10/1997 | Brady et al. ............. 340/572.7 |
| 5,691,731 A | 11/1997 | van Erven |
| 5,774,876 A | 6/1998 | Woolley et al. |
| 5,864,323 A | 1/1999 | Berthon |
| 5,914,640 A | 6/1999 | Nasserbakht |
| 5,929,813 A | 7/1999 | Eggleston |
| 6,018,299 A * | 1/2000 | Eberhardt ................ 340/572.7 |
| 6,023,244 A | 2/2000 | Snygg et al. |
| 6,385,407 B1 | 5/2002 | Inose |
| 6,538,569 B1 | 3/2003 | Dunn |
| 6,777,829 B2 | 8/2004 | Devilbiss et al. |
| 6,778,088 B1 | 8/2004 | Forster |
| 6,781,554 B2 | 8/2004 | Lee et al. |
| 6,784,789 B2 | 8/2004 | Eroglu et al. |
| 6,784,802 B1 | 8/2004 | Stanescu |
| 6,784,813 B2 | 8/2004 | Shanks et al. |

FOREIGN PATENT DOCUMENTS

| | | |
|---|---|---|
| WO | WO 99/65002 A1 | 12/1999 |

* cited by examiner

MULTIPLE FEED POINT SLOT ANTENNA

CROSS-REFERENCE TO RELATED APPLICATION

This application is a continuation of U.S. application Ser. No. 11/318,339, filed Dec. 23, 2005, which is a continuation of U.S. application Ser. No. 10/125,783, filed Apr. 18, 2002, now U.S. Pat. No. 6,985,119, which is a continuation-in-part of U.S. application Ser. No. 09/536,334, fired Mar. 25, 2000, now U.S. Pat. No. 6,628,237, the disclosure of which is incorporated by reference herein.

FIELD OF THE INVENTION

The present invention relates generally to a device and method for identifying a device or article of manufacture such as a container and, more particularly, to a device and method using the slot of the container as an antenna for remote communications.

BACKGROUND OF THE INVENTION

It is often necessary to monitor the location and movement of materials within a distribution center or manufacturing facility. One method of tracking the materials is to attach a wireless communication device, such as a radio frequency identification (RFID) transponder or other identification device, to an article of manufacture including any type of physical device or container that houses materials. This application refers to this physical device or article of manufacture as a container for brevity sake only.

By way of example, a liquid container such as a barrel or keg may include an identification device indicative of the liquid contained inside. A transmission device, such as an interrogation reader or transmitter, having an antenna device, is able to send information remotely through electronic signals. Such transmission device is placed throughout the distribution or manufacturing facility to receive signals transmitted from wireless communication devices. The signals are then passed to a central control system that monitors and records the applicable information. The central control system can also send information to its interrogation readers to send to the transponders for response and/or to be stored in the transponder's memory.

The information communicated by the containers in the system to the interrogation readers may be used for a number of reasons. For example, a statistical analysis may be made of the materials to maintain an accurate inventories, production flow rates, and other production standards. Additionally, the identification devices may include specific information about the materials housed within the containers, including date of manufacture, place of manufacture, type of product within the container, temperature of the container and ambient air, temperature of the contents of the container, pressure of the container, etc.

The wireless communication device must have some type of antenna arrangement to communicate information about the containers to the interrogation readers. It is generally known for wireless communication devices to include an antenna. It is often a problem for many wireless communication devices to provide antennas, especially if the wireless communication device is small or is required to be placed in a contained area. The length of the antenna must be tailored to the specific frequency at which the wireless communication device is designed to operate. For low frequencies in the MHz range or lower, an antenna may have to be several inches long to several feet long. The antenna may have to be several inches long for higher frequencies, to allow for successful communication at the desired operating frequency.

Additionally, the antenna must either be packaged inside the wireless communication packaging that houses the wireless communication device, or located external to the wireless communication device. External positioning of the antenna to the wireless communication device provides several other challenges when placing the wireless communication device in a confined area, such as in a container. The antenna may have additional problems radiating energy effectively if the antenna is contained internal to a device, such as a container.

A beer keg is one example of a container that one may wish to attach a wireless communication device. A beer keg has a substantially cylindrical shape with a smooth, uniform outer wall. There are no extensions or areas for effectively attaching the wireless communication device. Even if the wireless communication device can be attached to the keg, additional problems in packaging and unaltered communication exists when including an antenna for the wireless communication device as described above.

Some containers have a natural slot as a characteristic of their manufacture. A slot may be formed by edges of a conductive material coming together in close proximity forming a gap of air between the edges. A slot may also be formed by cutting out or removing material from a conductive surface to form an open or hollow area of free space or air. A slot could be formed by a curl of a cylinder or other surface to form a rim, whereby a slot is created by the gap between the end of the curl and the surface.

For example, a beer keg is made out of a metal material that has an outer wall with a curled end to form a rim. The keg rim is used for handling and movement of the keg. The curled portion of the rim bends inward towards the outer wall, leaving a small gap between the edge of the rim and outer wall. This small gap forms a slot that extends circularly around the keg, and can be used to provide a slot antenna for the wireless communication device. The wireless communication device can be designed to provide electronic connectivity to the slot when installed, so that the slot can be used to provide the effect of an antenna. Since the slot of the container may be several feet long, using the slot for the antenna may be advantageous for communication at lower frequencies where providing an antenna of sufficient length for communication at the desired frequency is problematic.

Therefore, it is advantageous to use the slot of a container to provide an effective antenna for a wireless communication device. In the parent application of the present invention, use of the slot was explored at length. However, it has been discovered that there may be occasions when it is desirable to change the radiation pattern of the slot antenna such that it has better omni-directional receive and transmit capabilities. Further, there may, on occasions, be a need to change the operating frequency of the slot antenna such that the wireless communication devices operates at multiple frequencies.

SUMMARY OF THE INVENTION

The present invention includes a wireless communication device using a slot antenna arrangement formed by the slot of a container. A wireless communication device is provided with the container to provide information about the identification or other aspects of the container as it moves through manufacturing, tracking or shipping facilities.

An antenna is provided for the wireless communication device so that it can communicate remotely with a transmitter/receiver. The present invention capitalizes on the phenomenon that exists whereby a slot in a conductive material, such as metal, aluminum, copper, or iron for instance, can be coupled to a wireless communication device's communications electronics to provide the effect of a pole antenna.

Some containers have by the nature of their construction a slot that can be used to provide a slot antenna. Alternatively, a slot can also be cut out of the container as well. Using a slot antenna instead of a pole antenna provides several advantages. The required length of the slot for the wireless communication device to operate at the desired frequency may be more easily implemented than could be provided by using a pole antenna. Additionally, the slot does not require that a pole device be placed inside or proximate to the container. This is especially helpful for lower frequency communications that require longer length antennas. Using the slot may also be less expensive than using a pole antenna. Additionally, a pole antenna may extend from the container thereby exposing the pole antenna to damage.

In one embodiment, the wireless communication device uses feed lines directly connected to the each edge of the slot.

In another embodiment, the wireless communication device includes feed lines that reactively couple with each edge of the slot.

In another embodiment, a conductive device is placed between the slot to couple the wireless communication device to the slot and provide the slot antenna.

In yet another embodiment, the wireless communication device is mounted on a non-conductive substrate in the slot. A feed line from the wireless communication device rests on the substrate such that it reactively couples with the slot to provide the slot antenna.

A technique is provided to ensure that the operating frequency of the slot matches the operating frequency of the wireless communication device to maximize the slot antenna radiation efficiency. A circuit is provided in between the slot and the wireless communication device to match the impedance of the slot to the impedance of the wireless communication device.

In an alternate embodiment, shorting posts are provided on the ends of the slot to create a slot with the desired length. The shorting posts are constructed out of a conductive material, such as metal, aluminum, copper or iron for example, and are placed between the slot's edges to short both sides of the slot together.

The present invention also provides a technique to improve the omni-directional transmission and reception capabilities of the slot antenna. In particular, multiple feed lines may be used at various points around the slot, thereby increasing the ability of the slot antenna to radiate and receive electromagnetic signals. The multiple feed points may be positioned such that reflections occurring on the antenna are cancelled. The multiple feed points may alternatively be positioned such that antennas with different operating frequencies are formed thereby.

Within this concept are multiple embodiments. In particular, there may a single radio frequency transmission line with multiple feed points connecting the transmission line to the slot antenna with one rectifier in the transmission line. In an alternate embodiment, there may be a transmission line with multiple feed points connecting the transmission line to the slot antenna with one rectifier per feed point. In still another alternate embodiment, multiple transmission lines may be used, each terminating with a feed point, connecting the transmission line to the slot antenna. In yet another alternate embodiment, the positions of the feed points are such that the slot antenna actually forms a plurality of antennas, each adapted to receive and transmit optimally different frequencies. It should be further appreciated that the type of transmission line may be varied, and suitable options include coaxial cable, insulated wires, micro-strip style transmission lines, or the like as needed or desired.

The invention also includes a method of monitoring the container. While the container is within a facility, such as during manufacturing, filling, or storing, the container is moved through at least one interrogation point containing an interrogation reader. Communication between the wireless communication device and the interrogation reader is established for monitoring the location and/or content information about the container. A central control system may be in communication with the interrogation point for monitoring the movement of the container. The central control system may monitor the position of the container, or it may also monitor specific information that is stored within memory in the device, or both.

DETAILED DESCRIPTION OF THE INVENTION

Figure 1:
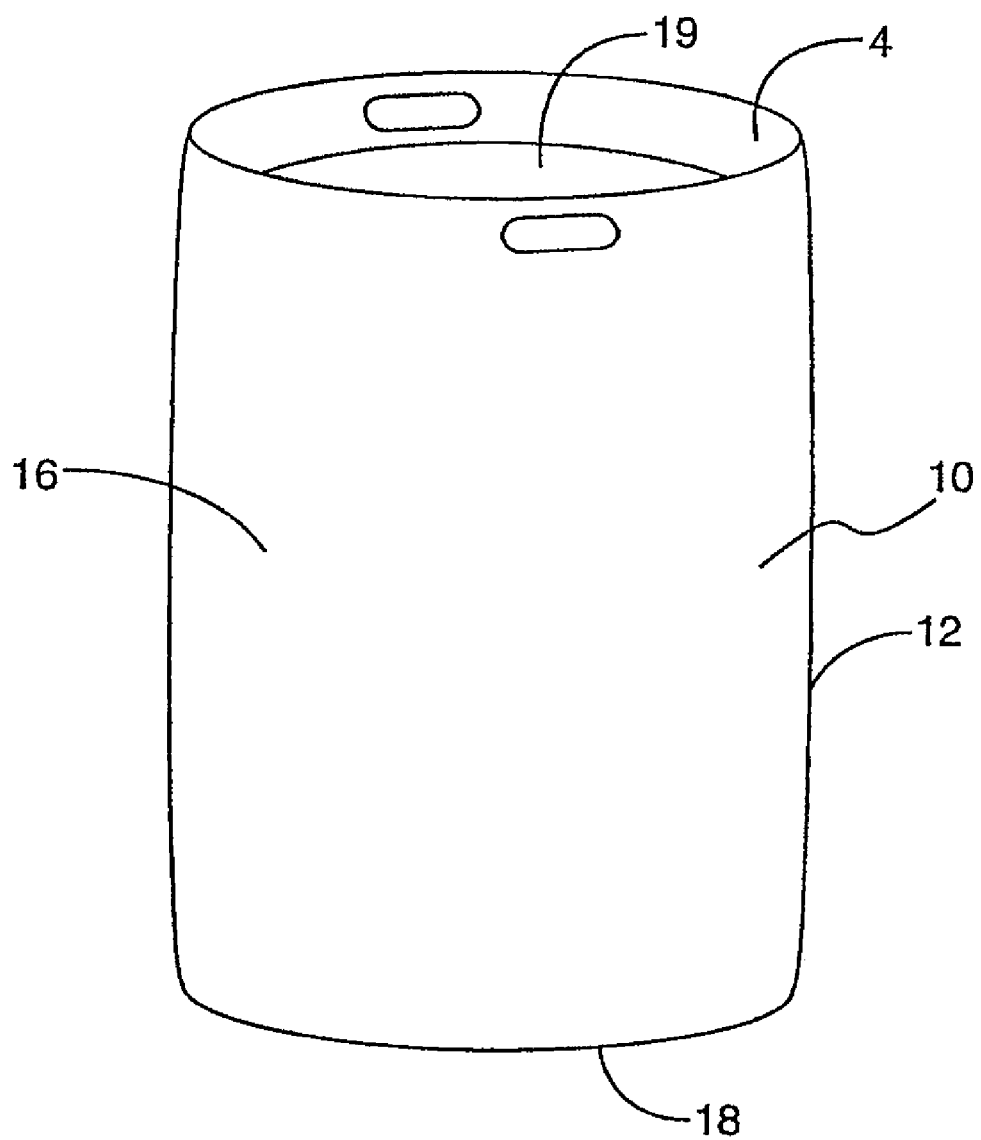
FIG. 1 is a perspective view of one type of container, known as a keg, constructed in accordance with the present invention.
Figure 2:
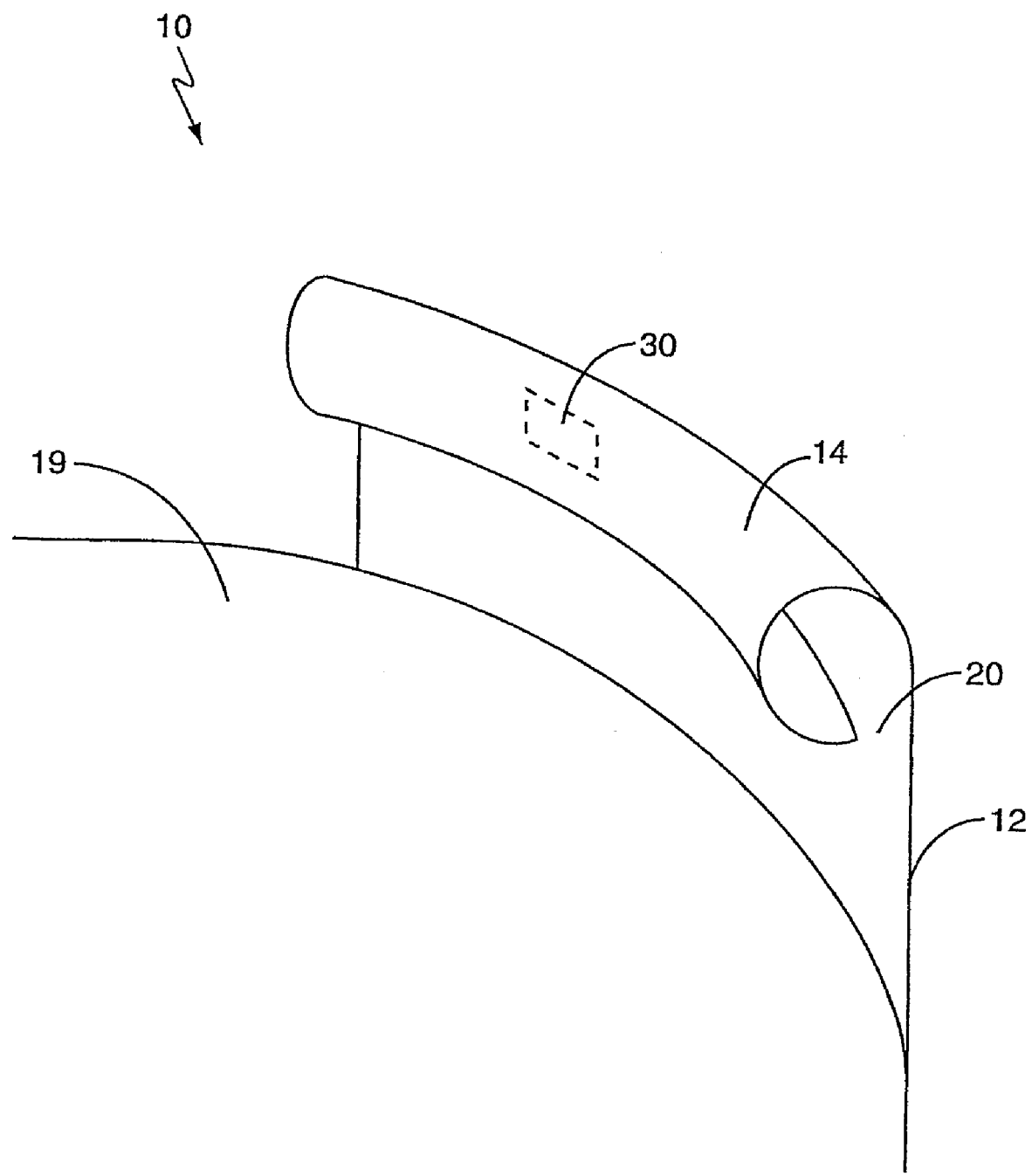
FIG. 2 is a cross sectional side view of the slot in the container.

The present invention is directed to a device and method of using a slot in a container as an antenna for a wireless communication device. As illustrated in FIGS. 1 and 2, the invention includes a wireless identification device 30, called a "transponder," that is mounted in a container 10 for identifying the container 10. The container 10 has outer walls 12, including a bottom wall 18, a top wall 19, and outer walls 12 sealed together forming an enclosed chamber for housing a material 16. A rim 14 is formed by the outer wall 12 and may extend above the top wall 19 and the bottom wall 18, for handling the container 10. The outer wall 12 extends upward and curls inward to form the rim 14. The gap between the end of the curled outer wall and the outer wall 12 is called the slot 20 that extends around the circumference of the container 10. A transponder 30 is provided within the rim 14. The transponder 30 may contain information about the container 10 that is communicated to at least one interrogation reader. It should be readily understood to one of ordinary skill in the art that the present invention is not limited to the particular container 10 illustrated in FIGS. 1 and 2, and that the present invention is applicable to other types of containers having a slot 20.

Figure 3:
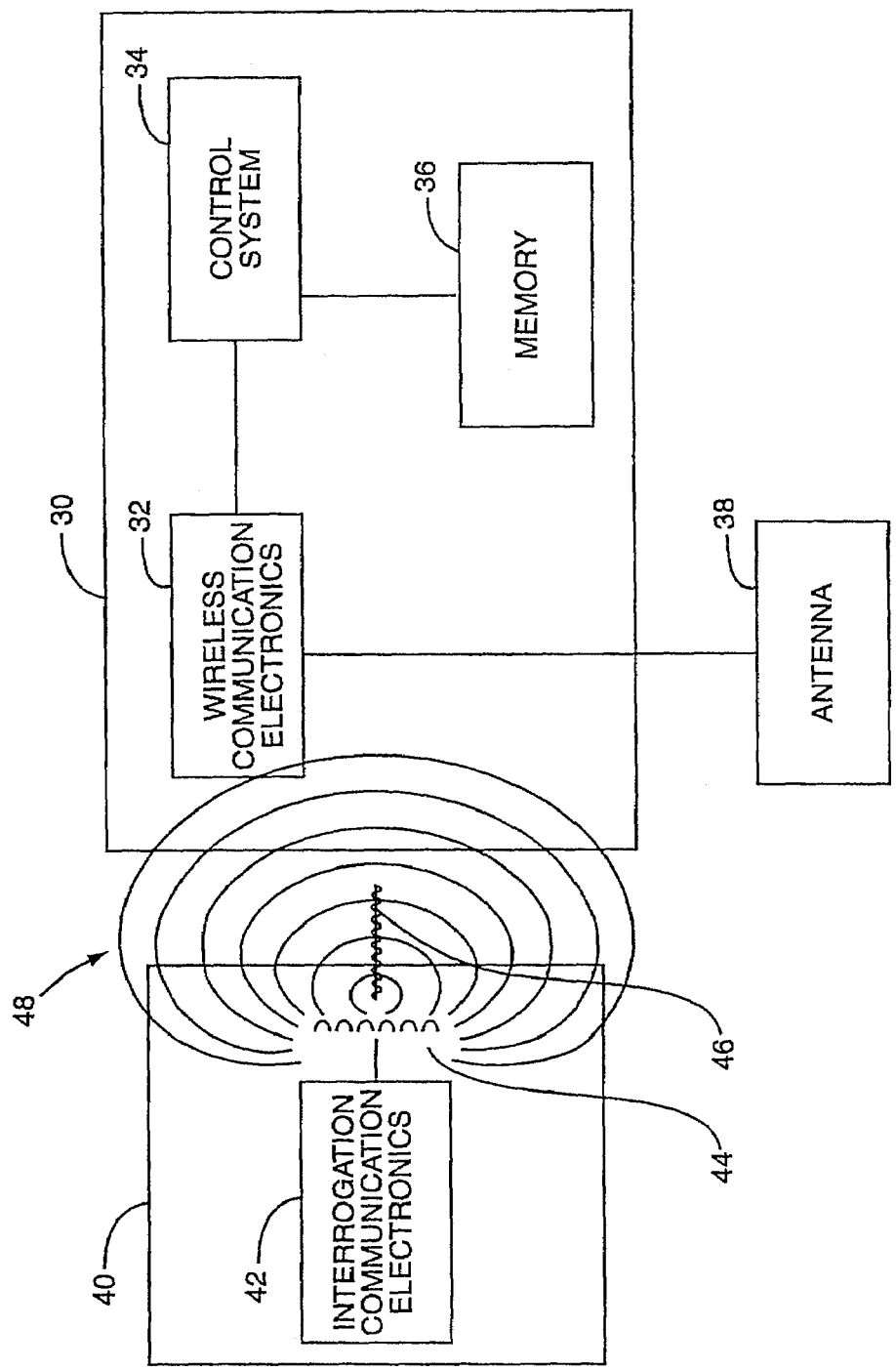
FIG. 3 is a schematic diagram illustrating communication between the transponder and an interrogation reader.

FIG. 3 illustrates one particular type of wireless communication device 30 called a radio frequency transponder 30. This application uses a transponder 30 to describe the present invention, but transponder 30 and wireless communication device 30 are equivalent devices that can be used interchangeably with the present invention. It should be readily understood to one of ordinary skill in the art that there are many other different types of wireless communication devices that allow electronic communication. The present invention is described as using a transponder 30 as the wireless communication device as these terms are interchangeable. The present invention is not limited to any one particular type of wireless communication device 30, including a transponder 30.

The transponder 30 includes a control system 34 and wireless communication electronics 32. The transponder 30 may also contain local memory 36 for storage of information to be communicated to an interrogation reader 40. Alternatively, the transponder 30 may store information, such as an identification number or indicia, by using diodes, dip switches, or some other like circuitry. However, the present invention is not limited to transponders 30 that contain memory 36. An antenna 38 is also provided for communications that may be either external to or 25 incorporated internal to the transponder 30. The particular type and location of the antenna 38 will depend on the operating frequency of the transponder 30 and the particular design desired.

The control system 34 is an integrated circuit or other type of microprocessor or micro-controller electronics that controls the substantive operations of the transponder 30. The control system 34 is connected to the wireless communication electronics 32 to communicate and receive transmissions. The control system 34 is also connected to memory 36 for storing and retrieving information. Control system 34 may further include a clock.

FIG. 3 also depicts how communication is achieved with the transponder 30. An interrogation reader 40 contains interrogation communication electronics 42 and an interrogation antenna 44. The interrogation reader 40 communicates to the transponder 30 by emitting an electronic signal or command 46 modulated in a frequency through the interrogation antenna 44. The interrogation antenna 44 may be any type of antenna that can radiate the modulated signal 46 through a field 48 so that a compatible device, such as the transponder 30, can receive such signal 46 through its own antenna 38. The field 48 could be any of a variety of different types used in electronic communications including electromagnetic, magnetic, or electric. The signal 46 is a message containing information and/or specific instructions for the transponder 30.

When the transponder antenna 38 is in the presence of the field 48 emitted by the interrogation reader antenna 44, the wireless communication electronics 32 are energized thereby energizing the transponder 30. The transponder 30 remains energized so long as its antenna 38 is in the field 48 of the interrogation reader 40. The wireless communication electronics 32 demodulates the signal 46 and send the message containing information and/or specific instructions to the control system 34 for appropriate actions. For example, the request in the message may be for the transponder 30 to communicate its identification information about the container 10 or the materials 16 housed within the container 10 including, but not limited to, date of manufacture, place of manufacture, and type of product within the container 10. The message may also be instructions to send back information regarding the temperature of the container 10, pressure levels, etc. The transponder 30 communicates back the information requested to the interrogation reader 40 by altering the contents of the signal 46 for whatever type of information is requested.

Alternative forms exist for communicating with a transponder 30, or other wireless electronic device. For instance, the transponder 30 may have a transmitter that can send information to the interrogation reader 40 without having to alter the content of the signal 46. The transponder 30 may contain its own power source, such as a battery, or other energy storage unit charged when the transponder 30 is in the field 48, to power the transmitter. It is understood to one of ordinary skill in the art there are many other manners in which to communicate with a wireless communication device, such as a transponder 30, and that the present invention is not limited to the particular manner described above.

FIGS. 4A-4D show various configurations of slot antenna arrangements to provide an antenna 38 by using the slot 20 in the container 10 as previously described. A slot 20 can provide a slot antenna 38 to the transponder 30 by coupling the transponder to the slot 20. More information on slot antennas 38 and their operation is described in U.S. Pat. No. 4,975,711, entitled "Slot antenna device for portable radiophone," incorporated hereby by reference in its entirety.

Voltage signals are provided by the transponder 30 to opposites sides of the slot 20. In the preferred embodiment for a beer keg container 10 embodiment, one side of the slot 20 is formed by the outer wall 12, and the other side of the slot 20 is formed by the rim edge 52. When the voltage signals are applied across the slot 20, the slot 20 radiates electromagnetic waves similar to the manner in which a pole antenna arrangement would radiate to effectuate communications.

Figure 4A:
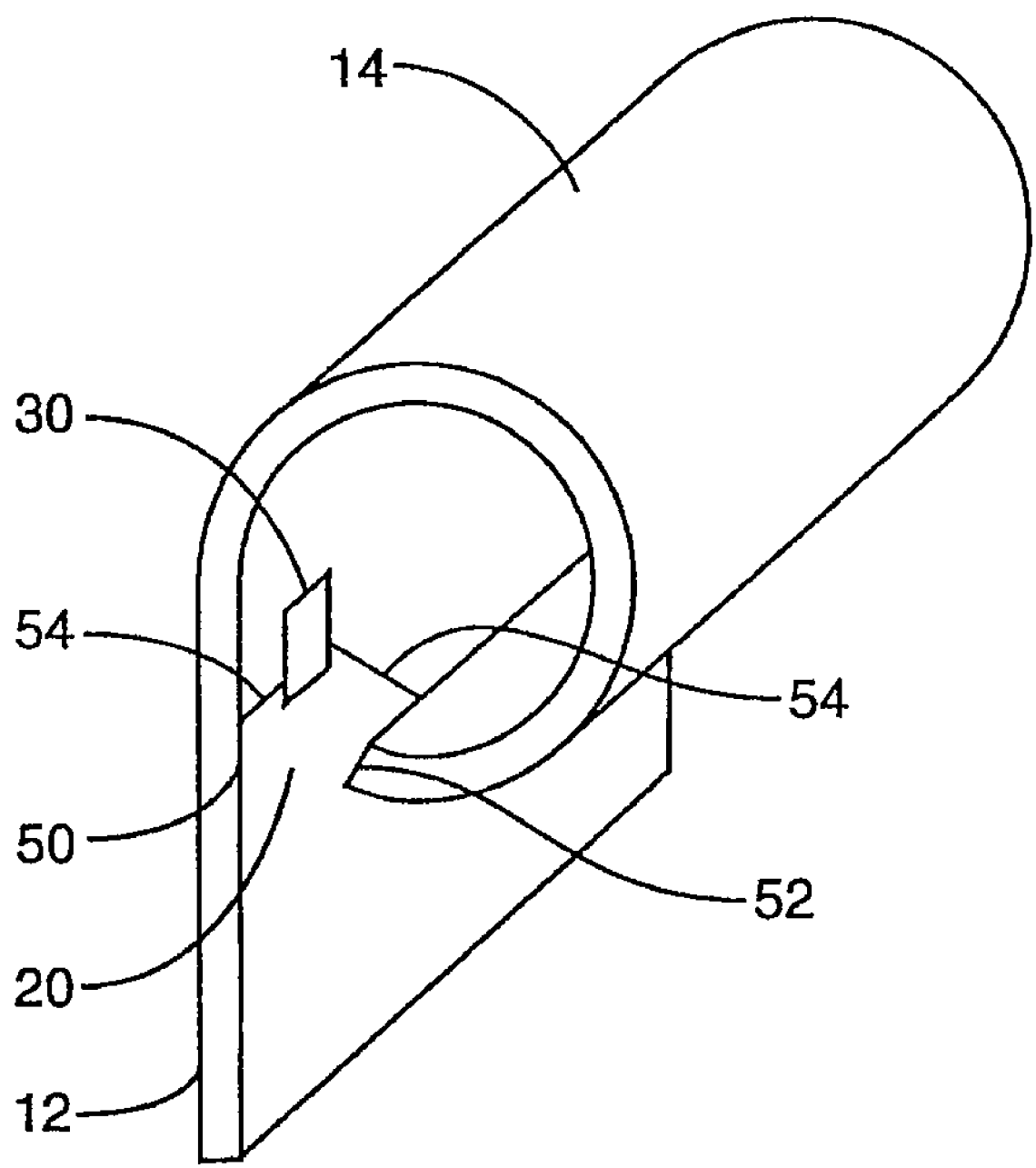
FIG. 4A is a schematic view of the slot antenna using direct feed lines.

FIG. 4A illustrates a close-up view of the outer wall 12 and the rim 14 illustrating how the transponder 30 uses the slot 20 as an antenna 38 using feed lines 54 to form a slot antenna 38. The transponder 30 is located in the inner portion of the rim 14. The slot 20 is formed by the gap between the outer wall edge 50 and the rim edge 52 that extends around the entire circumference of the container 10. Feed lines 54 are connected to the outer wall edge 50 and the rim edge 52 to provide an electrical connection between the transponder 30, particularly the wireless communication electronics 32, and the slot 20.

Figure 4B:
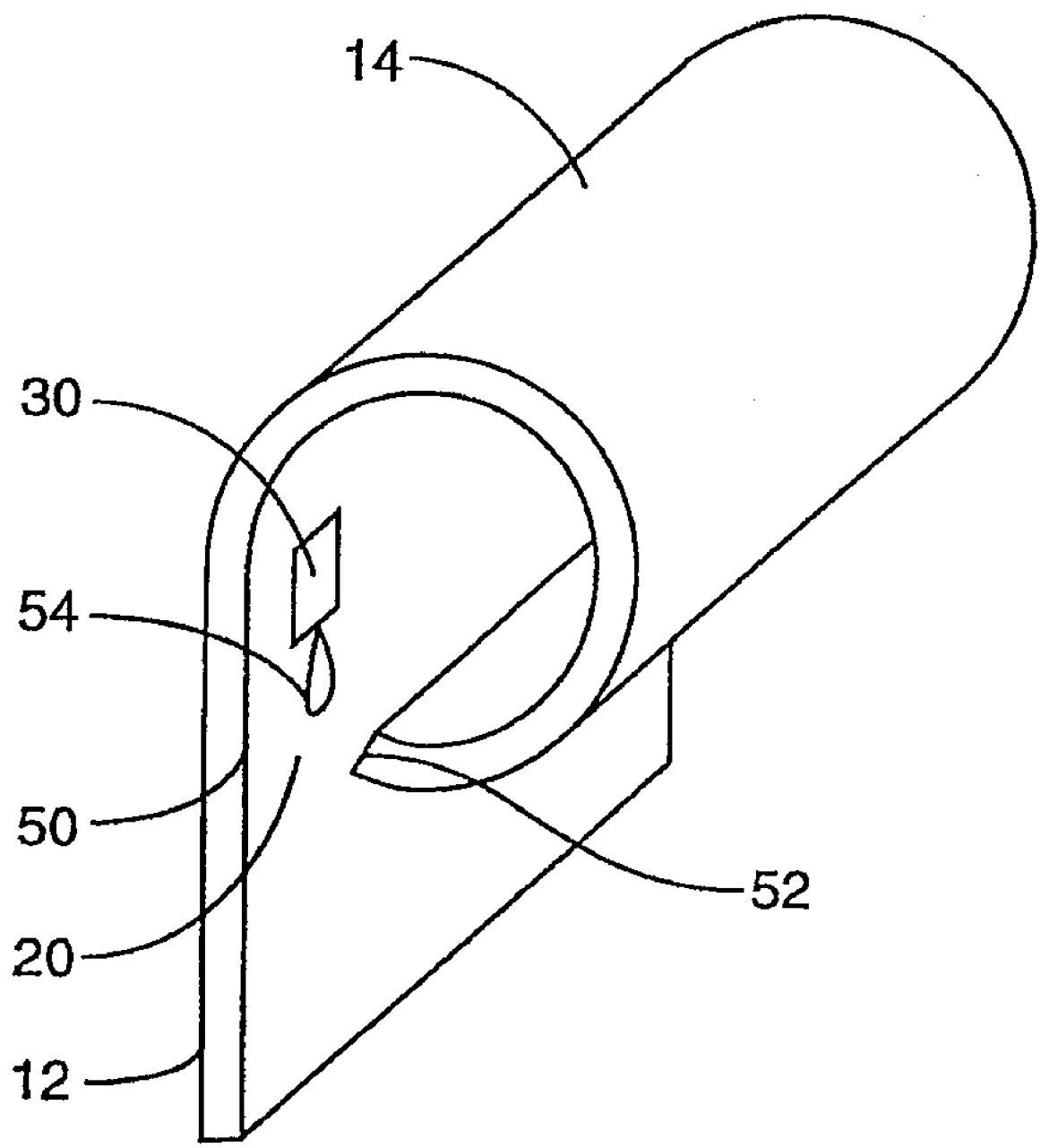
FIG. 4B is a schematic view of the slot antenna using reactive feed lines.

FIG. 4B contains an embodiment whereby the feed line 54 from the transponder 30 does not directly connect to the outer wall edge 50 or the rim edge 52. Instead, the feed line 54 is placed in close proximity to the outer wall edge 50 or the rim edge 52 to reactively couple to the slot 20. The feed line 54 is still excited without direct contact between the feed line 54 and the slot 20 due to its close proximity to the slot 20.

Figure 4C:
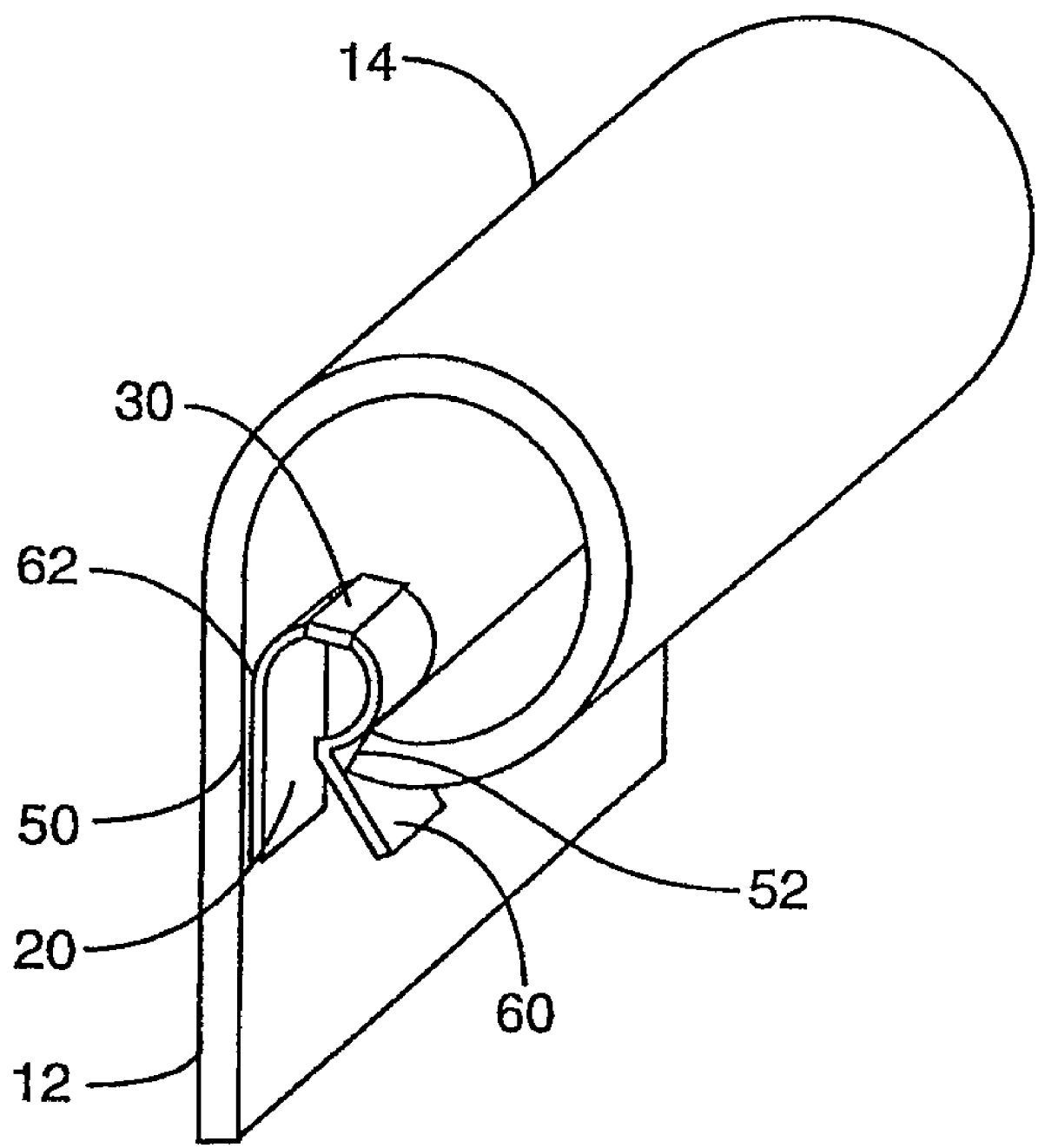
FIG. 4C is a schematic view of the slot antenna using a transponder mounting device as feed lines.

FIG. 4C illustrates an embodiment whereby a mounting device containing the transponder 30 is placed in the slot 20 to form the slot antenna 38, sometimes referred to as a conductive clip 60. A conductive clip 60, as used herein, is a device constructed out of a conductive material, such as metal, aluminum, copper, or iron for example. The conductive clip 60 keeps its form in a resilient manner, and can be inserted into a gap or space in a secure manner. The conductive clip 60 provides both a mounting technique for the transponder 30 and a connection between the wireless communication electronics 32 and the slot 20, to provide the slot antenna 38. The conductive clip 60 is substantially in the shape of an "R"; however, other types of clips with the same characteristics as described herein, may also be used. The transponder 30 is mounted to the top of the conductive clip 60. The conductive clip 60 is inserted with the round portion inside the slot 20 to provide a secure fit between the outer wall 12 and the rim edge 52. The portion of the conductive clip 60 contacting the outer wall 12 provides a ground plane 62 for the slot antenna 38. The portion of the conductive clip 60 contacting the rim edge 52 provides a connection or feed line 54 to the slot 20 to provide a slot antenna 38 for the transponder 30.

Figure 4D:
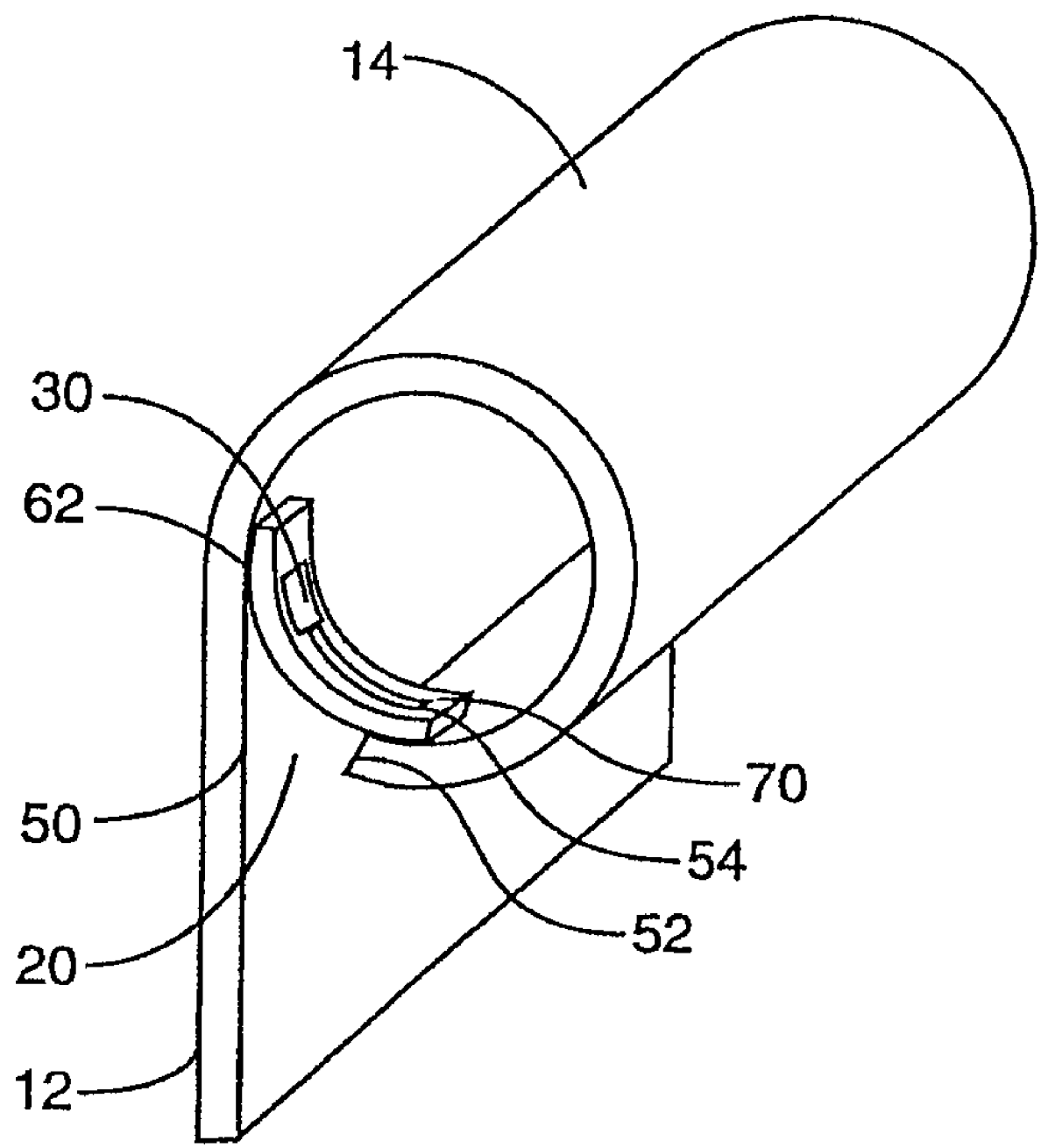
FIG. 4D is a schematic view of the slot antenna using feed lines on a non-conductive substrate to couple to the slot.

FIG. 4D shows another alternative arrangement whereby the transponder 30 is mounted to a substrate material 70. The substrate material 70 is a dielectric material. The substrate material 70 is curled and placed inside the rim 14. One side of the substrate material 70 contacts the outer wall 12, and the other side of the substrate material 70 contacts the rim edge 52. The transponder 30 has a feed line 54 that extends from the wireless communication electronics 32 and rests on the substrate material 70, extending downward proximate to the rim edge 52. The transponder 30, located proximate to the outer wall 12, provides coupling to the outer wall creating a ground plane 62 with earth. The feed line 54 extends to the rim edge 52 and is coupled with the rim edge 52, either as an open circuit or a short circuit, to provide the optimum coupling of the transponder 30 to the slot 20 to create the slot antenna 38, depending on the length of the feed line 54.

Figure 5:
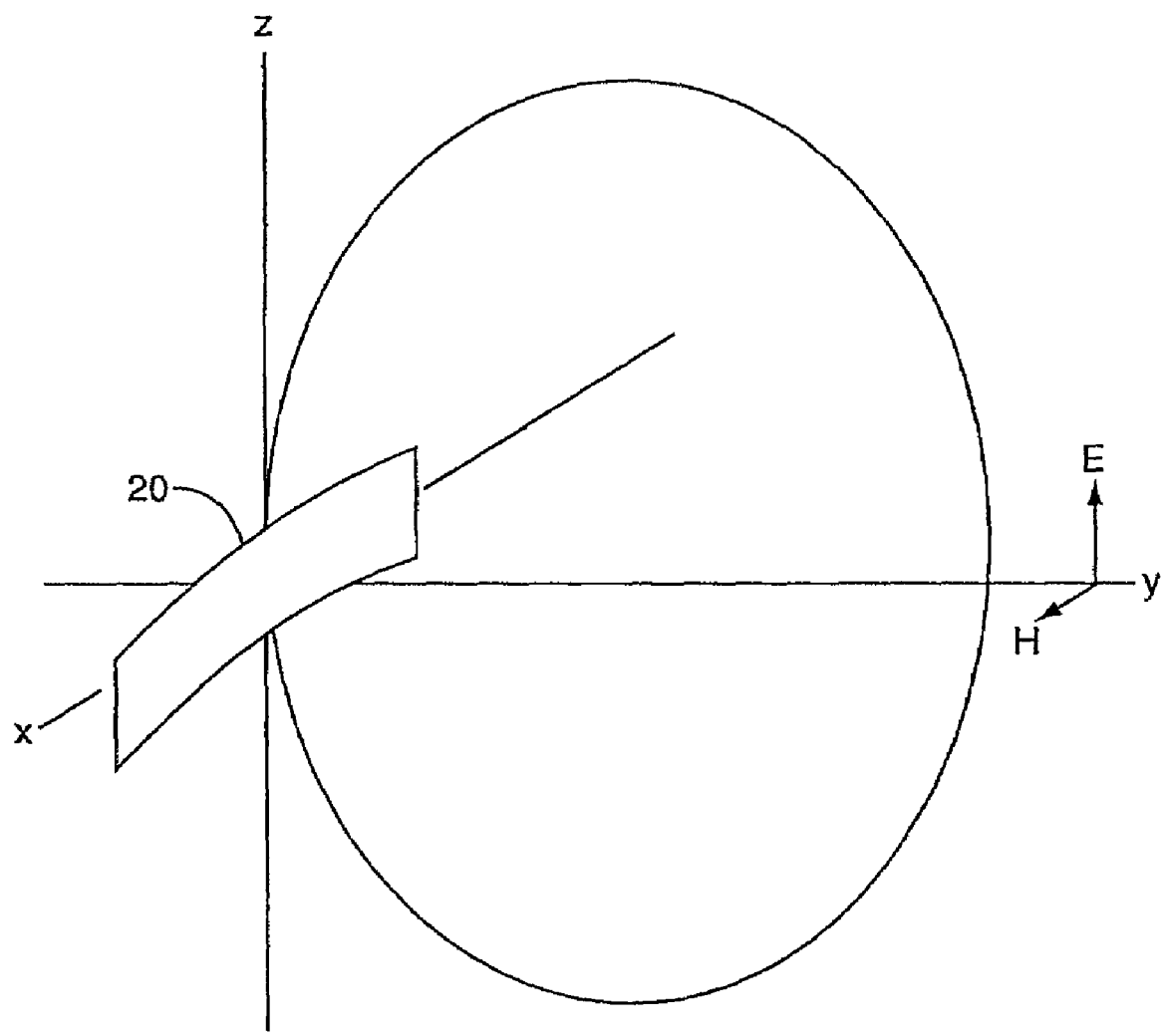
FIG. 5 is a schematic diagram illustrating the radiation pattern of the slot antenna arrangement.

FIG. 5 illustrates the radiation pattern of a slot antenna 38. As illustrated under theoretical conditions, the slot antenna 38 radiation pattern is similar to a pole antenna arrangement, such as a dipole antenna, but the E and H fields are interchanged. The actual radiation pattern of the slot antenna 38 in the present invention is a modified version of this radiation pattern, due to both the curved nature of the slot 20 and the reflection from the surface of the container 10. Therefore, while it is noted that the radiation of the slot antenna 39 may have the characteristics of that illustrated in FIG. 5, such is provided for background purposes only. The present invention is not limited to a slot antenna 38 with such radiation pattern.

Figure 6:
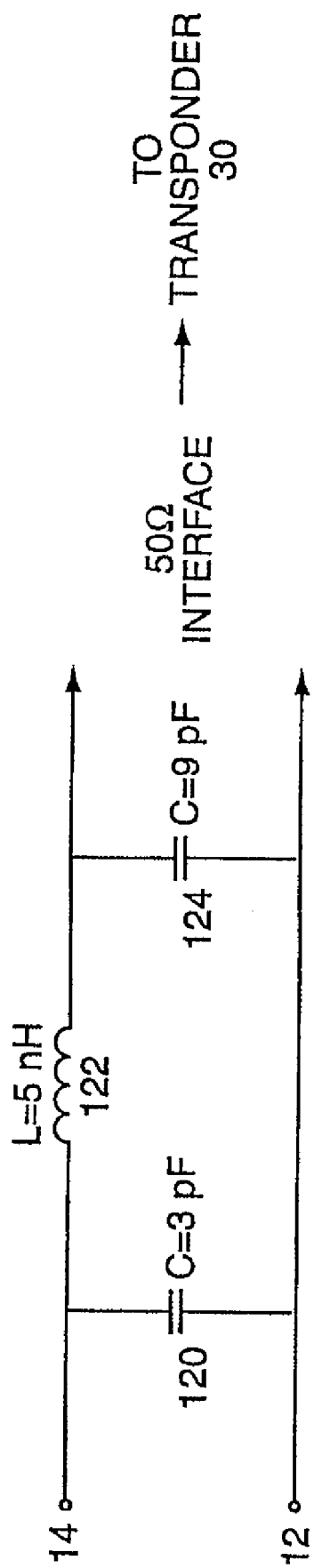
FIG. 6 is a schematic diagram of an impedance matching circuit between the slot antenna and the transponder.

When using a slot antenna 38, it is desired for the impedance of the slot 20 to match the impedance of the transponder 30 at the desired frequency to maximize energy transfer from the transponder 30 to the slot antenna 38. Such maximization of energy transfer allows the transponder 30 to emit a maximum radiation pattern. Maximum energy transfer occurs when the impedance of the transponder 30 is the conjugate of the slot 20 impedance. If the transponder 30 has a characteristic impedance that is not the conjugate of the slot 20, a matching network can be provided to do so. An antenna itself can be considered a matching network of sorts, transforming its terminal impedance to 377 ohms, the impedance of free space. However, the impedance of the transponder 30 may not be the same as the slot 20. In this instance, the slot antenna 38 may not perform optimally since the maximum energy transfer would not occur between the transponder 30 and the slot antenna 38. The slot 20 of the present invention has a fairly low impedance. Therefore, it may be necessary to transform the slot 20 impedance into the impedance of transponder 30 to maximum energy transfer and therefore maximize the strength of the radiation pattern emitted by the slot antenna 38. An impedance matching network, as illustrated in FIG. 8, is provided to match the impedance of the slot 20 to the impedance of the transponder 30 to ensure that the slot antenna 38 radiates an efficient radiation pattern for the operating frequency of the transponder 30 with minimal or no reflection. The matching network circuit converts the impedance of the slot 20 to the impedance of the transponder 30 for an operating frequency of 868 MHz. The transponder 30 has an impedance of 50 ohms. The matching network circuit is connected on the rim 14 and the outer wall 12 across the slot 20 in parallel with a capacitor 120 of approximately 3 pF. The capacitor 120 is connected in series to an inductor 122 of approximately 5 nH. Another capacitor 124, of approximately 9 pF, is connected in series on the other side of the inductor 122. The capacitor 124 is connected to the wireless communication electronics 32. It should be noted that the characteristics of containers 10 and slot 20 impedances for desired frequencies may require different matching networks than described herein. The present invention is not limited to the particular impedance matching network illustrated in FIG. 6.

Figure 7A:
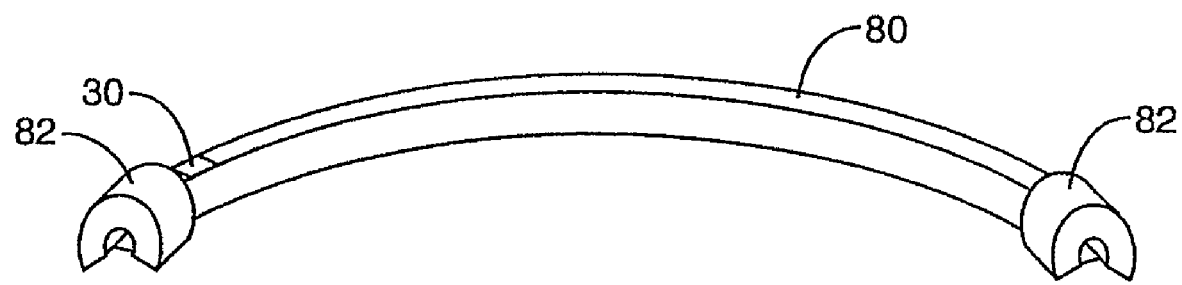
FIG. 7A is a schematic diagram of the slot antenna using shorting posts to create a monopole antenna equivalent.
Figure 8A:
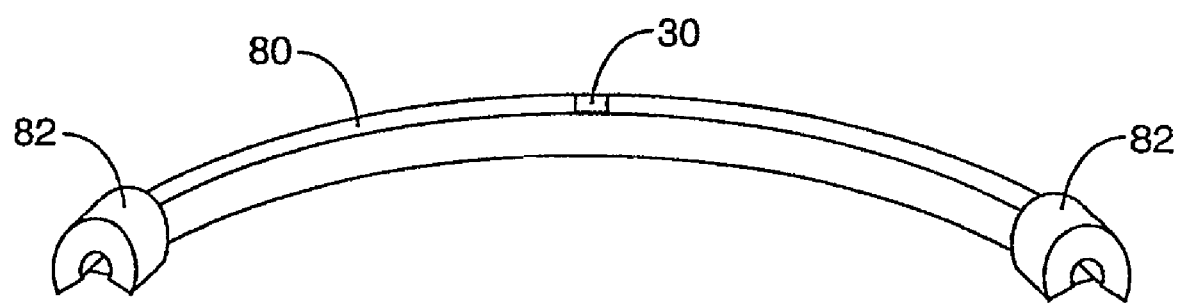
FIG. 8A is a schematic diagram of the slot antenna using shorting posts with the transponder in between the shorting posts to create a dipole antenna equivalent.
Figure 8B:
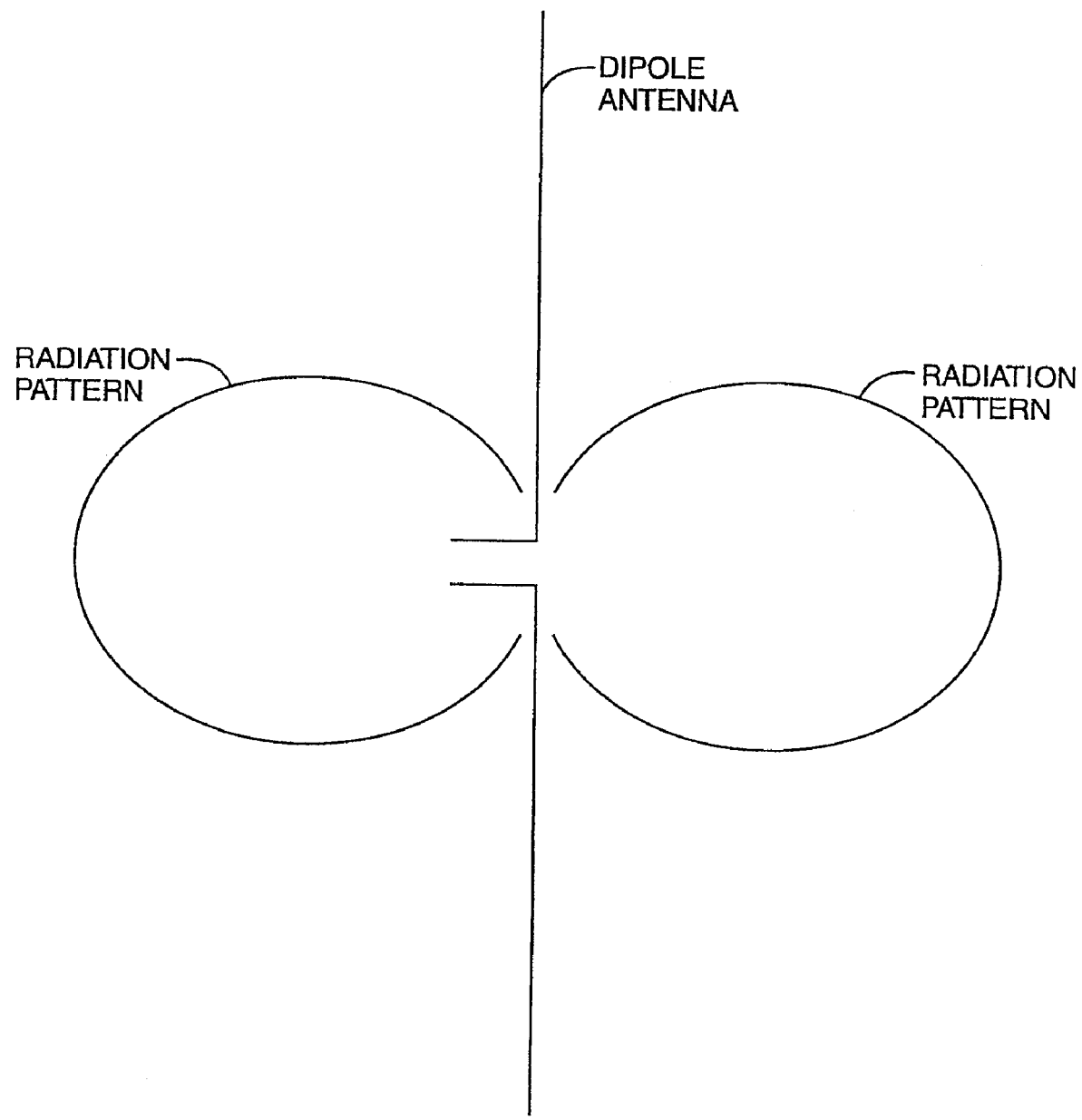
FIG. 8B is a schematic diagram of a typical dipole antenna radiation pattern.

In this exemplary embodiment, the container 10 has a continuous slot 20 that extends in a circular path. It may be desired to provide a technique or manner in which to define the length of the slot 20 so that the slot antenna 38 radiates in an improved manner at the operating frequency of the transponder 30. One method of defining the slot 20 length is to provide shorting posts 82 as illustrated in FIGS. 7A and 8A to further improve performance of the slot antenna 38 depending on the frequency. The length of antenna or the slot 20 for a slot antenna 38 is related to the radiation pattern of electronic signals radiated at the desired frequencies. For instance, the length of a dipole antenna is λ divided by 2 where λ is equal to the speed of light divided by the desired operating frequency, or equivalently, the wavelength. The length of the slot 20 is defined by the boundaries at which there is no longer a gap of space or the placement of conductive material. Some slot antennas 38 are designed in containers 10 or other materials in which the slot 20 is placed at a predefined and desired length. The slot 20 length is defined by providing a conductive material in the slot 20 that shorts one side of the slot 20 to the other side. In the preferred embodiment, this is the outer wall 12 and the rim edge 52. Shorting the slot 20 gives a finite length to the slot antenna 38. Shorting posts 82 are placed in the slot 20 at desired locations on each side of the location of transponder 30 coupled to the slot 20 to define the length of the slot 20. An impedance matching network may or may not be necessary with shorting posts 82, depending on if the impedance of the slot 20 and the impedance of the transponder 30 are matched sufficiently in order for the slot antenna 38 to emit a desired radiation pattern.

Figure 7B:
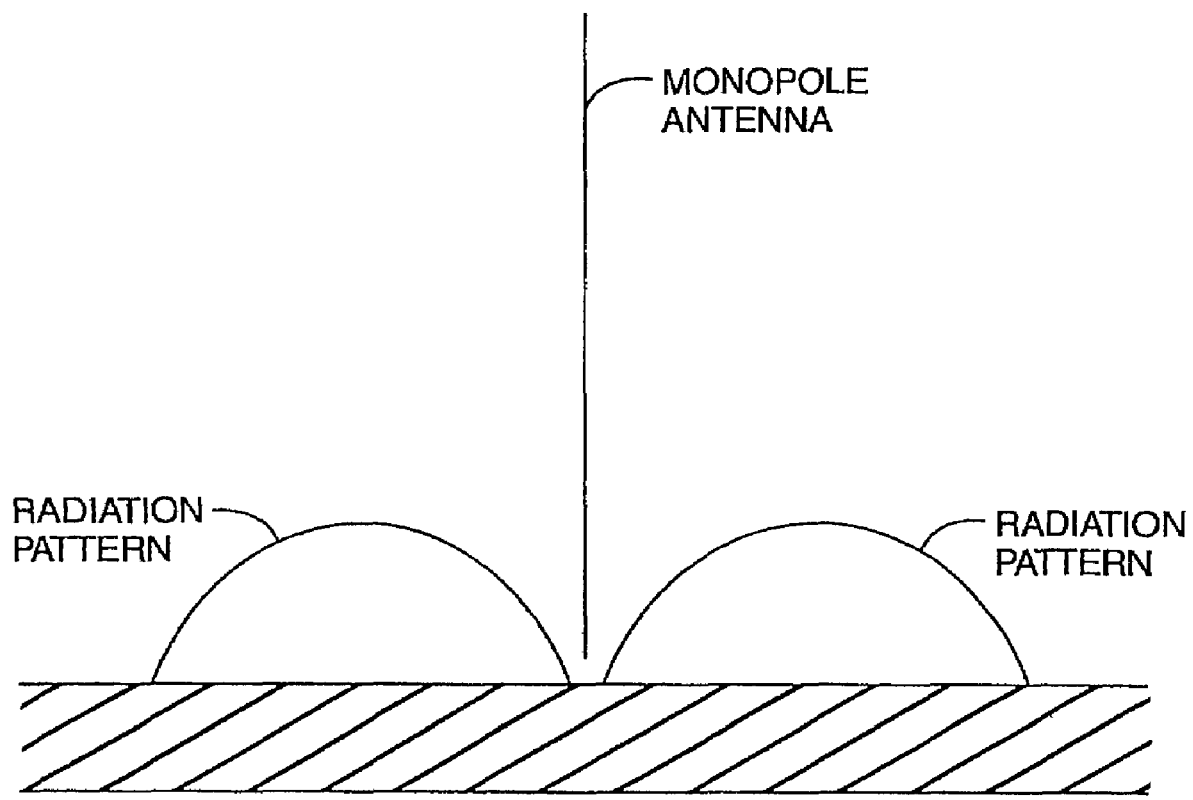
FIG. 7B is a schematic diagram of a typical monopole antenna radiation pattern.

FIG. 7A illustrates an arrangement where one shorting post 82 is located near to or proximate to the transponder 30 and the other shorting post 82 is located a distance away from the transponder 30. The transponder 30 is mounted to a carrier material 80 that is placed inside the rim 14 for mounting the transponder 30 and shorting posts 82. The carrier material 80 is used as a convenient manner in which to mount the transponder 30 and the shorting posts 82 in the rim 14 of the container 10. The carrier material 80 is made out of a non-conductive material so that it does not conduct with the slot 20, i.e. the outer wall 12 or the rim edge 52. The transponder 30 is coupled to the slot 20 to provide slot antenna 38 by techniques of coupling the transponder's 30 wireless communication electronics 32 as previously described above. Coupling the transponder 30 to the slot 20 at or proximate to one of the shorting posts 82 creates a slot antenna 38 similar to a radiation pattern of monopole antenna like that shown in FIG. 7B, but it should be noted that the exact radiation pattern of the slot antenna 38 may be different depending on the frequency of the transponder 30 and the shape and other characteristics of the container 10.

Alternatively, as illustrated in FIG. 8A, the transponder 30 and shorting posts 82 are mounted on the carrier material 80 to mount inside the rim 14 of the container 10 similar to FIG. 7A. However, the transponder 30 is coupled to the slot 20 between the two shorting posts 82. Coupling the transponder 30 to the slot 20 in the middle or center of the shorting posts 82 creates a slot antenna 38 similar to a dipole like shown in FIG. 8B, but it should be noted that the exact radiation pattern of the slot antenna 38 may be different depending on the frequency of the transponder 30 and the shape and other characteristics of the container 10.

In addition to changing the length of the slot antenna 38 through the use of shorting posts, there may be occasions when it is desirable to change the number and location of feed lines 54 thereby changing the radiation pattern of the slot antenna 38. In particular, the introduction of additional feed lines 54 may allow the slot antenna to receive and reflect incident radiation from any angle around the container 10.

Figure 9:
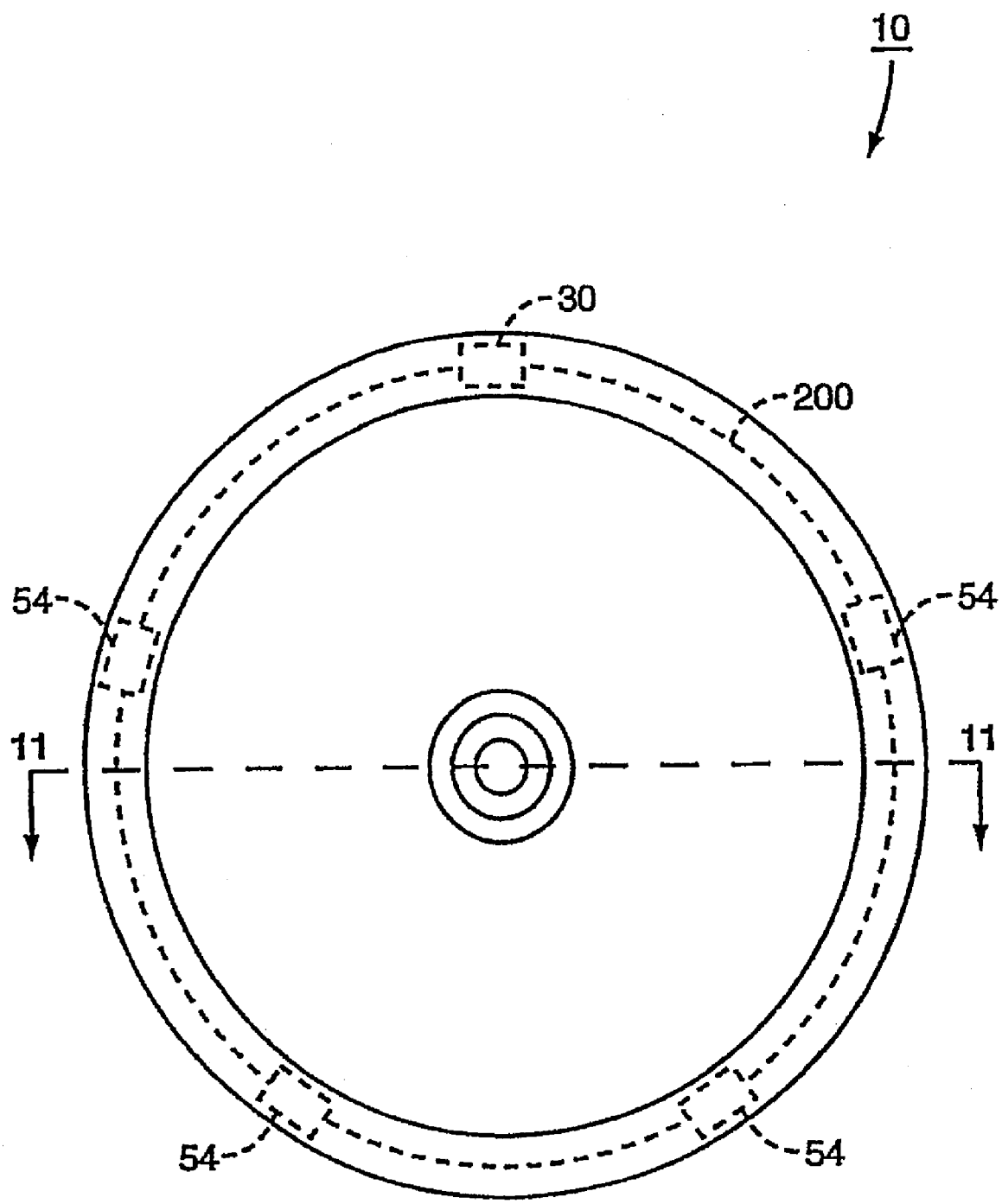
FIG. 9 is a top plan view of a container with multiple feed points.
Figure 10:
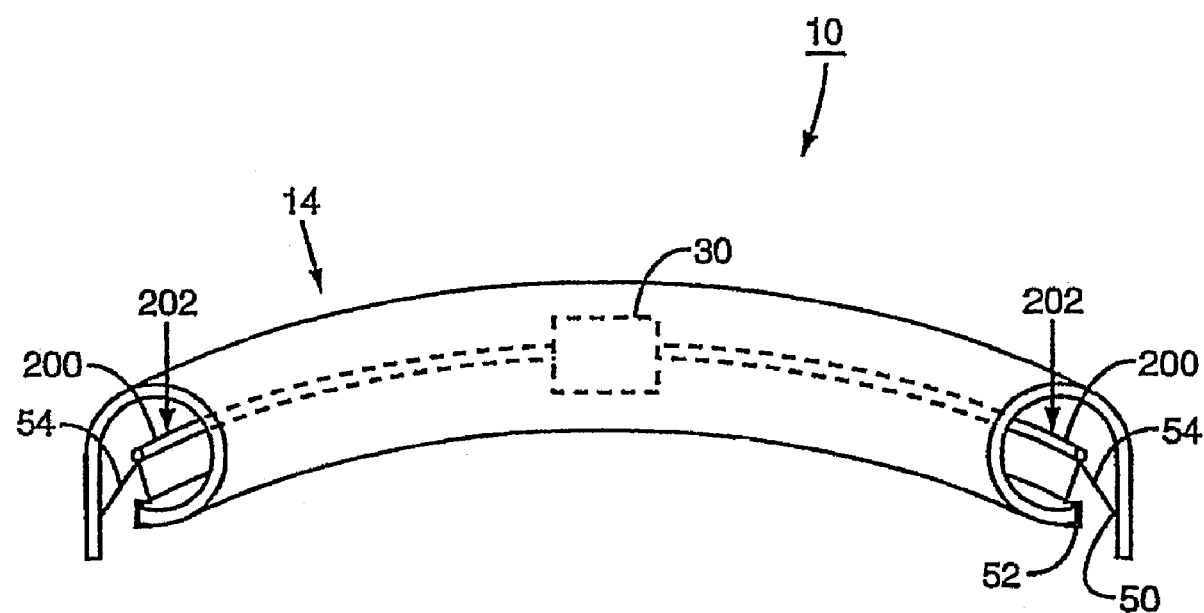
FIG. 10 is a partial cross-sectional view along lines 11-11 of FIG. 9.

As illustrated in FIGS. 9 and 10, a conductor 200 may be positioned in loop 202 (FIG. 10) formed by rim 14 and particularly rim edge 52 and outer wall 12. A plurality of feed lines 54 electrically couple the conductor 200 to the slot 20. Conductor 200 is also electrically connected to the transponder 30. Conductor 200 may be any radio frequency transmission line, such as a coaxial cable, a twisted pair, a micro-strip or the like. Multiple feed points 54 are provided between the slot 20 and the transponder 30. Feed points 54 are points on the slot 20 that are connected to the transponder 30. It should be appreciated that the plurality of feed points 54 may be positioned, such that reflections between different feed points 54 and the transponder 30 cancel. This occurs, as is well understood in the transmission line art, when the length between the points is an odd integer multiple of ¼ wavelength of the operating frequency. Note also that the number of feed points 54 may be varied as needed or desired to achieve an optimal reflection pattern.

In FIG. 10, the feed points 54 may also provide additionally functionality for mounting purposes, such as in the form of as spring clips that hold the conductor 200 in place. It should be appreciated that nonconductive spring clips may be used to hold the conductor 200 in place. In this manner, the feed points 54 serve only as an electrical connection between the conductor 200 and the slot 20.

It should be appreciated that the number and positioning of the feed points 54 makes effectively a plurality of antennas for the transponder 30, each potentially operative at a different frequency. Thus, the entire slot 20, would be a first operative antenna. The slot between any given feed point 54 and the transponder 30 would form another antenna, at a different frequency. It is possible that, dependent on the angle from which the incident radiation is received, cancellation of the signal received from two of these different antennas may occur, resulting an effective null. However, as the container 10 is expected to be moving through the field 48 of the interrogation reader 40, the antennas will also move within the field 48, and the null will be eliminated.

Figure 11:
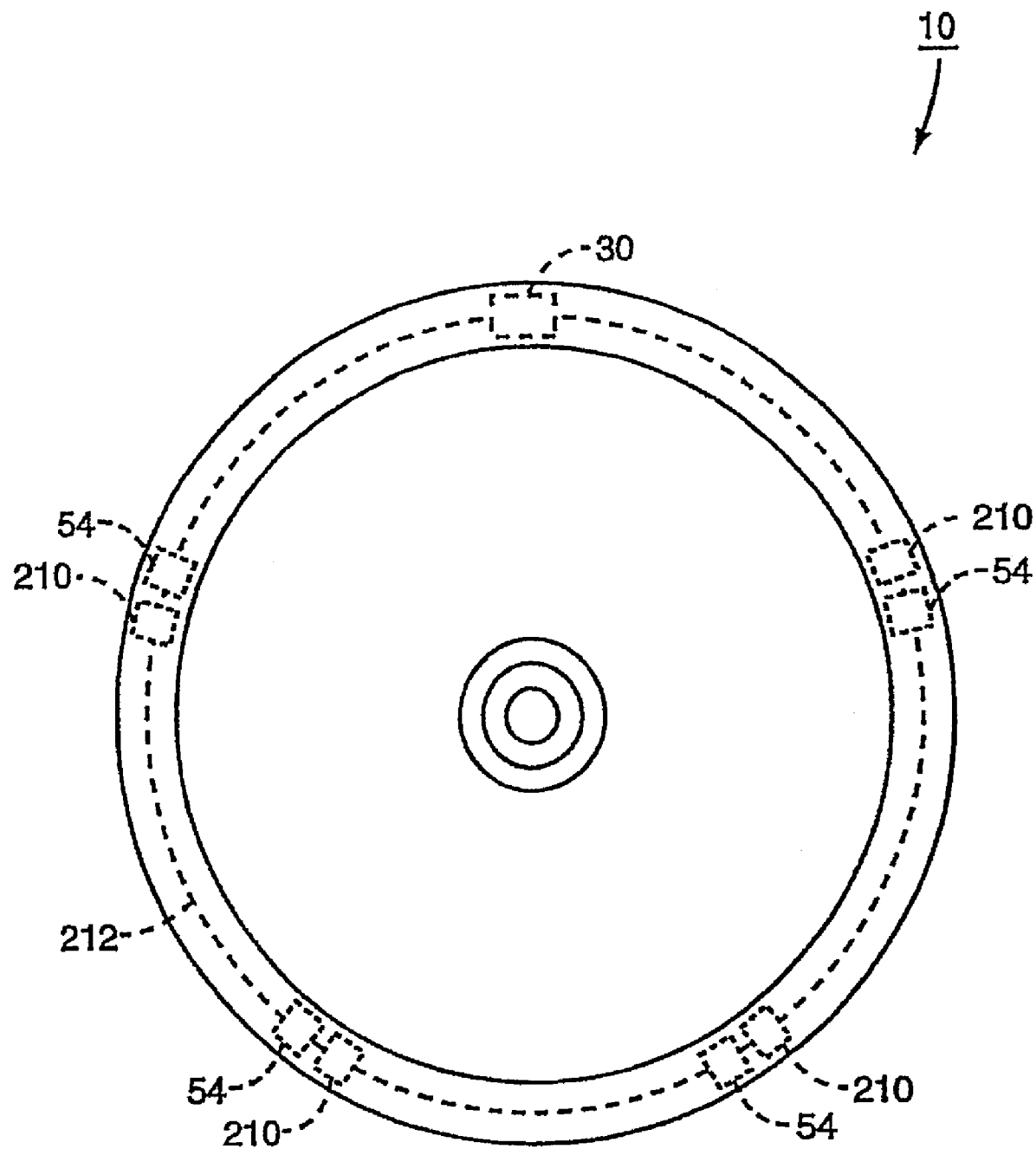
FIG. 11 is a top plan view of an alternate embodiment of a container with multiple feed points.

FIG. 11 shows an alternate embodiment of sing multiple feed points. In particular, a rectifier 210 may be associated with each feed point 54. In the previous embodiment, there was only one rectifier 210, and it was incorporated into the transponder 30. In the present embodiment, each feed point 54 includes its own rectifier 210. In this manner, nulls are eliminated as each rectifier 210 produces a DC voltage and detects AM modulation of the incoming radio frequency signal. Altering the DC load from the transponder 30 may change the impedance of the rectifiers 210, causing a modulated reflection to send data back to the interrogation reader 40. A DC line 212 connected to the transponder 30 may interconnect the rectifiers 210, providing power and data communications at any angle. The DC line 212 may be a conductor buried in plastic or the like, as needed or desired. As the antennas are not connected at radio frequencies, they do not interact in DC line 212, thereby preventing nulls in the receive pattern. The rectifiers 210 may also be connected to multiple feed points that are matched to slot antennas 38 operating at different frequencies, giving the multi-frequency capability discussed above.

Figure 12:
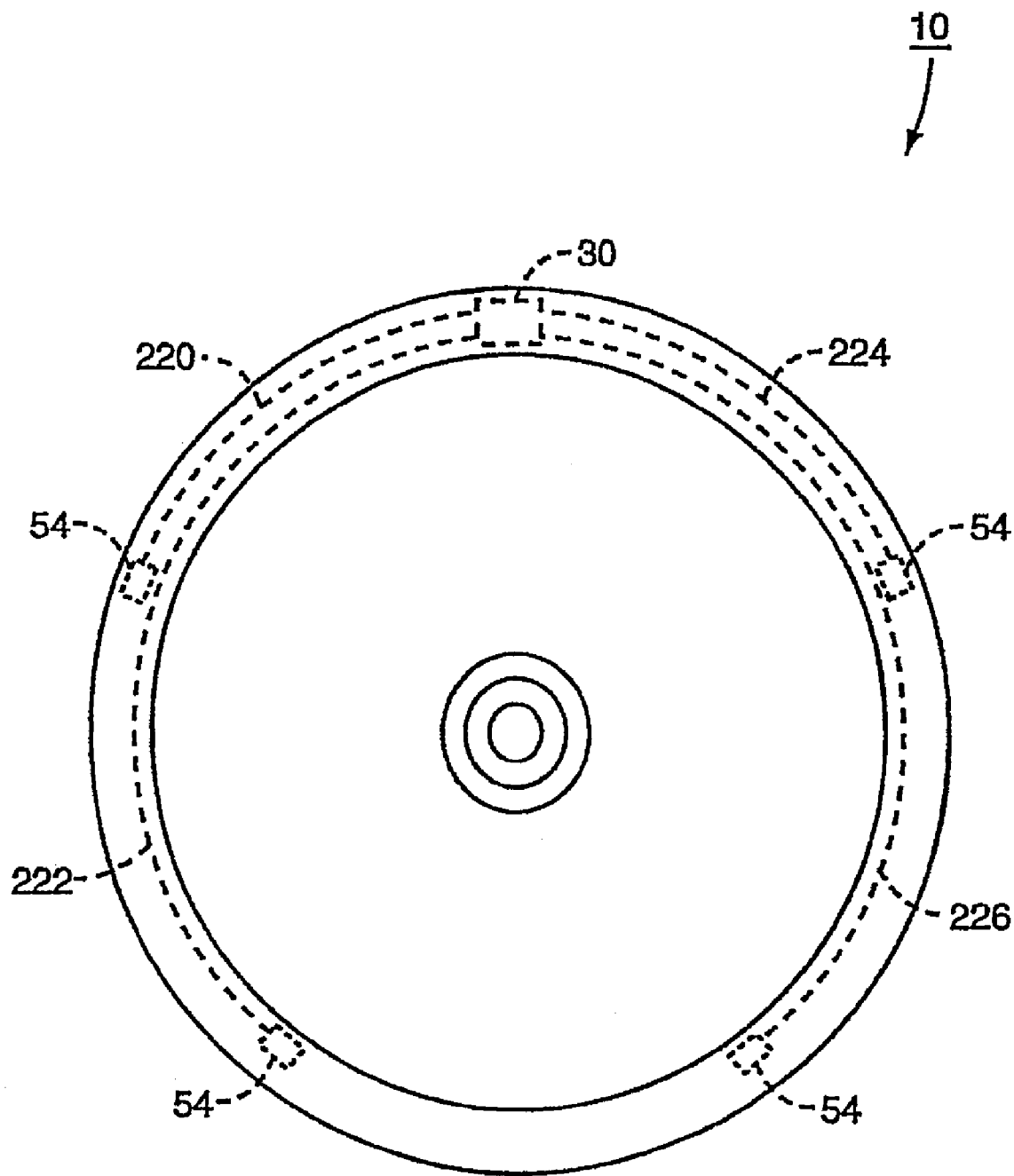
FIG. 12 is a top plan view of an alternate embodiment of a container with multiple feed points and multiple feed lines.

Another alternate embodiment is illustrated in FIG. 12, wherein multiple conductors 200, 222, 224 and 226 are used to connect the transponder 30 to a number of feed points 54, in place of the single conductor 202 of FIGS. 10 and 11. These conductors 220, 222, 224, and 226 may be any conventional conductor, such as coaxial cable, twisted pairs, micro-strips, or the like, as needed or desired. Where wires are used, they may be bundled to conserve space. Again, the number and placement of the feed points 54 may be varied to change the operative frequencies, change likely destructive interference or the like as needed or desired.

Figure 13:
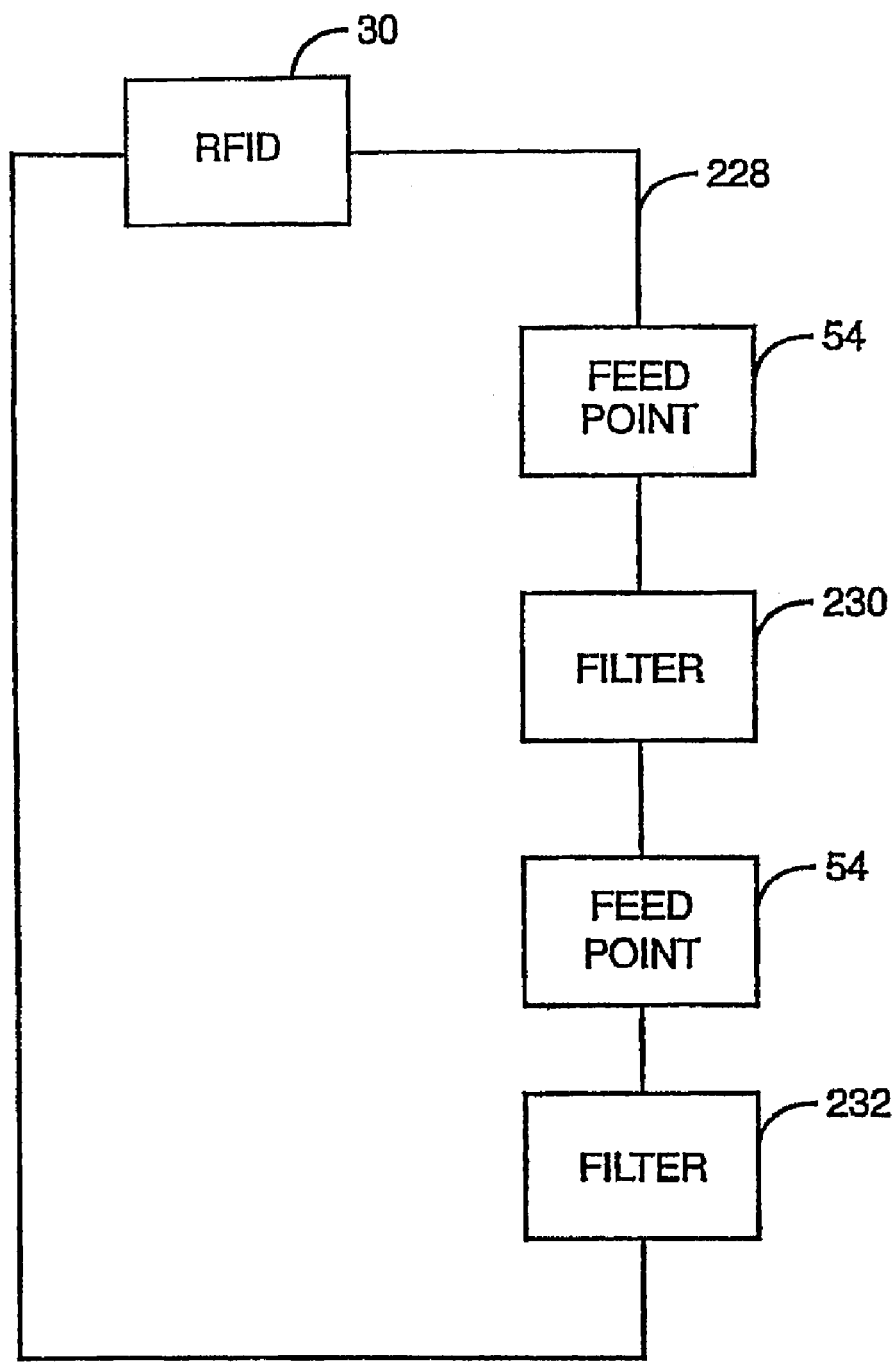
FIG. 13 is a schematic diagram of a micro-strip transmission line embodiment.

FIG. 13 illustrates yet another alternate embodiment of the present invention. Using a micro-strip transmission line is especially well suited for this embodiment. An example of a micro-strip transmission line is contained in U.S. Pat. No. 6,023,244 entitled "Microstrip antenna having a metal frame for control of an antenna lobe," incorporated herein by reference in its entirety. A micro-strip transmission line consists a piece of thin dielectric substrate that contains electronic components mounted in front of a ground plane, reducing mass production cost and product weight. In particular, the present embodiment incorporates electronic components into the transmission line 228. Thus, for example, the transmission line 228 may include feed points 54 and filters 230, 232. This may be accomplished by stubs with open or short circuits, narrowing or widening the micro-strip transmission line, or other appropriate technique as is well understood in the transmission line art. Aside from filters, other electronic components may also be performed using the transmission line 228. For example, impedance matching, couplers, splitters, and the like, may all be facilitated through the present embodiment.

Figure 14:
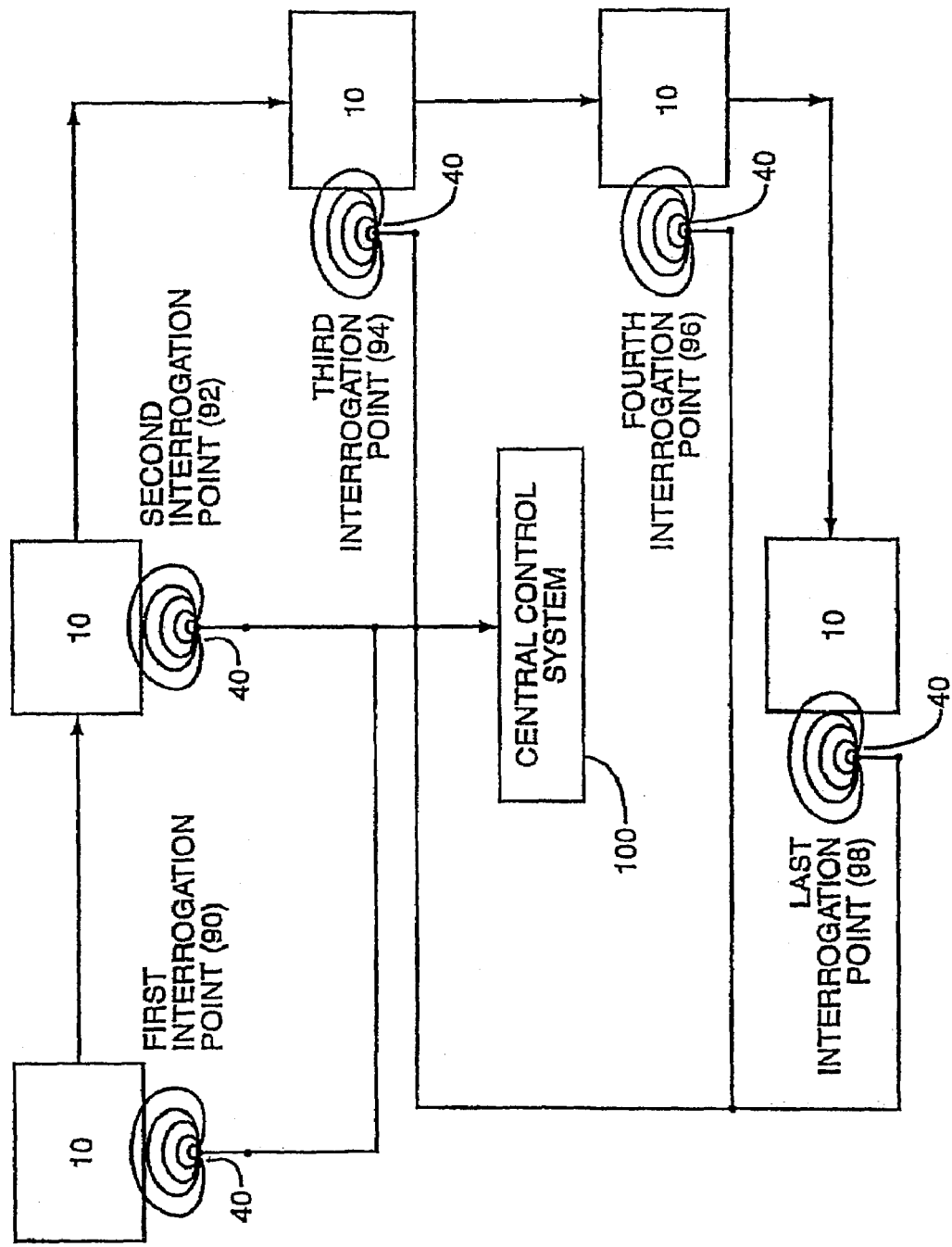
FIG. 14 is a schematic diagram illustrating the tracking and information system to track containers having a transponder.

FIG. 14 illustrates a tracking system in which containers 10 containing transponders 30 can be tracked through an environment such as a factory or distribution facility. For example, the transponder 30 connected to container 10 could pass a first interrogation point 90 that includes an interrogation reader 40. When the container 10 and its transponder 30 is in the presence of the interrogation reader 40 as described previously, a message containing information and/or a specific request for information may be transmitted by the interrogation reader 40 and received by the transponder 30. This process continues as the container 10 moves to a second interrogation point 92, a third interrogation point 94, a fourth interrogation point 96, and on to a last interrogation point 98.

A central control system 100 maintains the information from the interrogation readers 40 and monitors the movement of the containers 10 through the facility. The information received by each of the interrogation readers 40 may be forwarded to the central control system 100 either through direct wire or LAN connection. The central control system 100 could also send information to the interrogation reader 40 to be transmitted to the transponder 30 for identification purposes. The central control system 100 tracks the expected location of the containers 10 and may be alerted if it expects to receive information about a particular container and does not.

During commissioning of each container 10, it may be necessary to place the container 10 containing the transponder 30 in range of an interrogation reader 40 in order to erase previously stored information in memory 36 or to store particular data or configuration information about the container 10 in memory 36 for later use.

In the foregoing description, like-reference characters designate like or corresponding parts throughout the several views. Certain modifications and improvements will occur to those skilled in the art upon a reading of the foregoing description. It should be understood that the present invention is not limited to any particular type of container or slot arrangement. One of ordinary skill in the art will recognize that there are different manners in which containers with slots can be used to provide antenna functionality for a wireless communication device in accordance with the present invention. It should be understood that all such modifications and improvements have been deleted herein for the sake of conciseness and readability but are properly within the scope of the following claims.

What is claimed is:

1. A device for communicating information associated with a container having a slot, comprising:
   a wireless communication device to communicate information associated with the container wirelessly; and
   a slot antenna electrically associated with the wireless communication device, said slot antenna formed by a conductive clip that couples the wireless communication device to the slot.

2. The device of claim 1, wherein the conductive clip comprises aluminum.

3. The device of claim 1, wherein the conductive clip is constructed from metal.

4. The device of claim 1, wherein the conductive clip is formed substantially in the shape of an "R".

5. The device of claim 4, wherein the conductive clip contacts an outer wall of the container to form a ground plane.

6. The device of claim 4, wherein the conductive clip contacts a rim edge of the container to form a connection feed point.

7. The device of claim 1, wherein the wireless communication device is mounted on a top portion of the conductive clip.

8. A system for communicating information associated with a container, comprising:
   a container having a slot;
   a wireless communication device to remotely communicate information associated with the container;
   a slot antenna formed by a conductive clip that electrically couples the wireless communication device to the slot.

9. A method of using a slot in a container as an antenna, comprising:
   associating a wireless communication device with the container;
   positioning a conductive clip within the slot to form a feed point to a slot antenna formed by the slot in the container, wherein the conductive clip is electrically connected to the wireless communication device; and
   communicating information associated with the container between the wireless communication device and an inteffogation reader.

10. The method of claim 9 further comprising interrogating the wireless communication device at a plurality of frequencies.

11. The method of claim 9, wherein the wireless communication device is mounted on the conductive clip.

12. A container, comprising:
   a slot formed in the container;
   a wireless communication device associated with the container; and
   a mounting device contacting the slot of the container to provide a connection feed point for the wireless communication device,
   wherein the slot in the container forms a slot antenna that is usable by the wireless communication device to remotely communicate information associated with the container.

13. The container of claim 12, wherein the slot is formed by a curl in the container that forms a rim of the container.

14. The container of claim 12, wherein the slot is formed by at least two pieces of conductive material in proximity to one another.

15. The container of claim 12, wherein the slot is formed by an area of free space contained on a conductive surface of the container.

16. The container of claim 12, wherein the mounting device is a conductive clip.

17. The container of claim 16, wherein the conductive clip is formed substantially in the shape of an "R".

18. The container of claim 16, wherein the conductive clip comprises copper.

19. The container of claim 16, wherein the conductive clip is made of iron.

20. A method of using a slot in a container as an antenna, comprising:
   associating a wireless communication device with the container;
   forming a feed point to a slot antenna formed by the slot in the container using a conductive clip attached to the container, wherein the conductive clip is electrically connected to the wireless communication device; and
   through the slot antenna, communicating information associated with the container between the wireless communication device and an inteffogation reader.

21. The method of claim 20, wherein the feed point is formed by contacting the conductive clip with a rim of the container.

22. The method of claim 20 further comprising forming a ground plane from the conductive clip and the container.

* * * * *

UNITED STATES PATENT AND TRADEMARK OFFICE
CERTIFICATE OF CORRECTION

PATENT NO. : 7,432,869 B2
APPLICATION NO. : 11/469360
DATED : October 7, 2008
INVENTOR(S) : I. J. Forster et al.

It is certified that error appears in the above-identified patent and that said Letters Patent is hereby corrected as shown below:

| COLUMN | LINE | |
|---|---|---|
| 12 (Claim 9, | 11 line 11) | "inteffogation" should read --interrogation-- |
| 12 (Claim 20, | 55 line 11) | "inteffogation" should read --interrogation-- |

Signed and Sealed this

Twenty-eighth Day of July, 2009

JOHN DOLL
*Acting Director of the United States Patent and Trademark Office*